United States Patent
Ivkushkin et al.

(10) Patent No.: US 11,290,397 B2
(45) Date of Patent: Mar. 29, 2022

(54) SYSTEMS AND METHODS FOR EFFICIENTLY STORING A DISTRIBUTED LEDGER OF RECORDS

(71) Applicant: Insolar Technologies GmbH, Zug (CH)

(72) Inventors: Kirill Ivkushkin, Moscow (RU); Vladimir Stepanov, Moscow (RU); Pavel Kirillov, Moscow (RU); Andrei Zhulin, Moscow (RU); Petr Fedchenkov, Moscow (RU); Dmitrii Zhulin, Moscow (RU)

(73) Assignee: INSOLAR HOLDING LTD., Nicosia (CY)

( * ) Notice: Subject to any disclaimer, the term of this patent is extended or adjusted under 35 U.S.C. 154(b) by 32 days.

(21) Appl. No.: 17/075,495

(22) Filed: Oct. 20, 2020

(65) Prior Publication Data
US 2021/0036970 A1    Feb. 4, 2021

Related U.S. Application Data

(63) Continuation-in-part of application No. 16/507,665, filed on Jul. 10, 2019.

(51) Int. Cl.
| | |
|---|---|
| *H04L 12/861* | (2013.01) |
| *H04L 49/90* | (2022.01) |
| *H04L 49/9015* | (2022.01) |
| *G06F 9/46* | (2006.01) |
| *H04L 69/22* | (2022.01) |
| *H04L 9/06* | (2006.01) |

(52) U.S. Cl.
CPC .......... *H04L 49/9042* (2013.01); *G06F 9/466* (2013.01); *H04L 9/0643* (2013.01); *H04L 49/9015* (2013.01); *H04L 69/22* (2013.01); *H04L 2209/38* (2013.01)

(58) Field of Classification Search
CPC ............. H04L 49/9042; H04L 9/0643; H04L 49/9015; H04L 69/22; G06F 9/466
See application file for complete search history.

(56) References Cited

U.S. PATENT DOCUMENTS

| | | | | |
|---|---|---|---|---|
| 2019/0122222 A1* | 4/2019 | Uechi | ..................... | G06Q 20/10 |
| 2019/0349426 A1* | 11/2019 | Smith | ................... | H04L 9/3239 |

* cited by examiner

*Primary Examiner* — Samina F Choudhry
(74) *Attorney, Agent, or Firm* — Arent Fox LLP; Michael Fainberg (57) ABSTRACT

Systems and methods for efficiently storing a distributed ledger of records. In an exemplary aspect, a method may include generating a record comprising a payload and a header, wherein the payload stores a state of a data object associated with a distributed ledger and the header stores a reference to state information in the payload. The method may further comprise including the record in a trunk filament comprising a first plurality of records indicative of historic states of the data object, wherein the trunk filament is part of a first lifeline. The method may include identifying a jet of the distributed ledger, wherein the jet is a logical structure storing a second lifeline with a second plurality of records. In response to determining that the first plurality of records is related to the second plurality of records, the method may include storing the first lifeline in the jet.

19 Claims, 7 Drawing Sheets

SYSTEMS AND METHODS FOR EFFICIENTLY STORING A DISTRIBUTED LEDGER OF RECORDS

CROSS-REFERENCE TO RELATED APPLICATIONS

This application is a continuation in-part of and claims the benefit of U.S. Non-Provisional application Ser. No. 16/507,665, filed Jul. 10, 2019, which is herein incorporated by reference.

FIELD OF TECHNOLOGY

The present disclosure relates generally to the field of blockchain technology, more specifically, to systems and methods for efficiently storing a distributed ledger of records and providing means of reasoning about cause and effect relationships between records in the distributed ledger.

BACKGROUND

Blockchain technology is an emerging technology for decentralized digital recordkeeping and is being used in a growing number of businesses and industries. The blockchain is a data structure that stores a list of transactions and can be thought of as a distributed electronic ledger that records transactions between a source and a destination, or a sender and a recipient. The transactions are batched together into blocks and every block refers back to or is linked to a prior block in the chain. Moreover, the transactions themselves may be linked to each other, thus forming a chain. Computer nodes, sometimes referred to as miners, maintain the blockchain and cryptographically validate each new block (and the transactions contained therein) using a proof-of-work system or other schemes.

Blockchain networks immutably store the fact that transactions take place, but do not offer functionality to store the reason why such transactions take place to form the reasoning behind a chain of events. The immutability of the existing method also makes data erasure in compliance with specific regulations impossible. More specifically, existing distributed ledger networks only store a history of object changes, but none of them provide means to natively record the reasons for state changes.

Instead, those utilizing such other networks are only able to store reasons using solutions that have to be tailor-made for each application, which requires a lot of human effort and processing when building applications. For example, Ethereum can store various kinds of data but cannot support a universal way to track causes between applications. This means that there is no common way to analyze reasons for changes. Tracking could be supported within the ledger on a business logic level, but not on the platform level. This results in a lack of interaction between applications in a distributed ledger because applications do not have a platform-standardized cause-tracking method. Moreover, existing DLT networks do not allow for data wipeout because the integrity of the blockchain would break. Hence, in such networks data that may be subject to subsequent deletion must be kept entirely off the blockchain, which compromises efficiency of the business process.

SUMMARY

To address these shortcomings, the present disclosure discusses a system and method for efficiently storing a distributed ledger of records.

According to an exemplary aspect of the present disclosure, a method may include generating a record comprising a payload and a header, wherein the payload stores a state of a data object associated with a distributed ledger and the header stores a reference to state information in the payload. The method may further comprise including the record in a trunk filament comprising a first plurality of records indicative of historic states of the data object, wherein the trunk filament is part of a first lifeline that further comprises one or more branch filaments comprising auxiliary information associated with the data object. The method may include identifying a jet of the distributed ledger, wherein the jet is a logical structure-container storing several lifelines with a second plurality of records indicative of historic states of a plurality of data objects. In response to determining that the first plurality of records is related to the second plurality of records (i.e., whether they are associated with a same object), the method may include storing the first lifeline in the jet. Thus, data associated with the object will not be collected from different places when processing within one network cycle.

In some aspects, the plurality of data objects can be reordered between a plurality of jets in accordance with a statistic of inter-object calls for optimization purposes.

In some aspects, determining that the first plurality of records is related to the second plurality of records based on a record affinity function that is applied to all records in question.

In some aspects, the distributed ledger comprises a plurality of jets. In this plurality, one jet contains separate data objects that relate to that jet alone and are not associated with any other jet in the plurality of jets.

In some aspects, the auxiliary information in the one or more branch filaments comprises records indicative of at least one of (but not limited to): received requests, transmitted requests, and processing logs.

In some aspects, records in the distributed ledger are processed in cycles (e.g., pulses), and wherein all records registered within a first cycle for all lifelines in the jet are stored in a first jet drop (a physical storage unit), and all records registered within a second cycle for all lifelines in the jet are stored in a second jet drop. If the first jet drop and second jet drop belong to one jet, then the second jet drop has a utility record, which refers to the first jet drop. This linking method is configured for connecting jet drops chronologically.

In some aspects, the generated record is stored in the first jet drop, and indexing information about the first jet drop is stored in a DropEcho structure.

In some aspects, the method includes wiping out data in the generated record at a subsequent time without corrupting data integrity of the distributed ledger.

In some aspects, wiping out the data in the generated record comprises erasing data in the payload and not erasing data in the header. The method further comprises storing a reason for erasing the data in the payload in the DropEcho structure, and validating the reason by confirming that erasing the data in the payload took place in accordance with rules of a blockchain network maintaining the distributed ledger.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure.

This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for managing and storing a distributed ledger of records. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
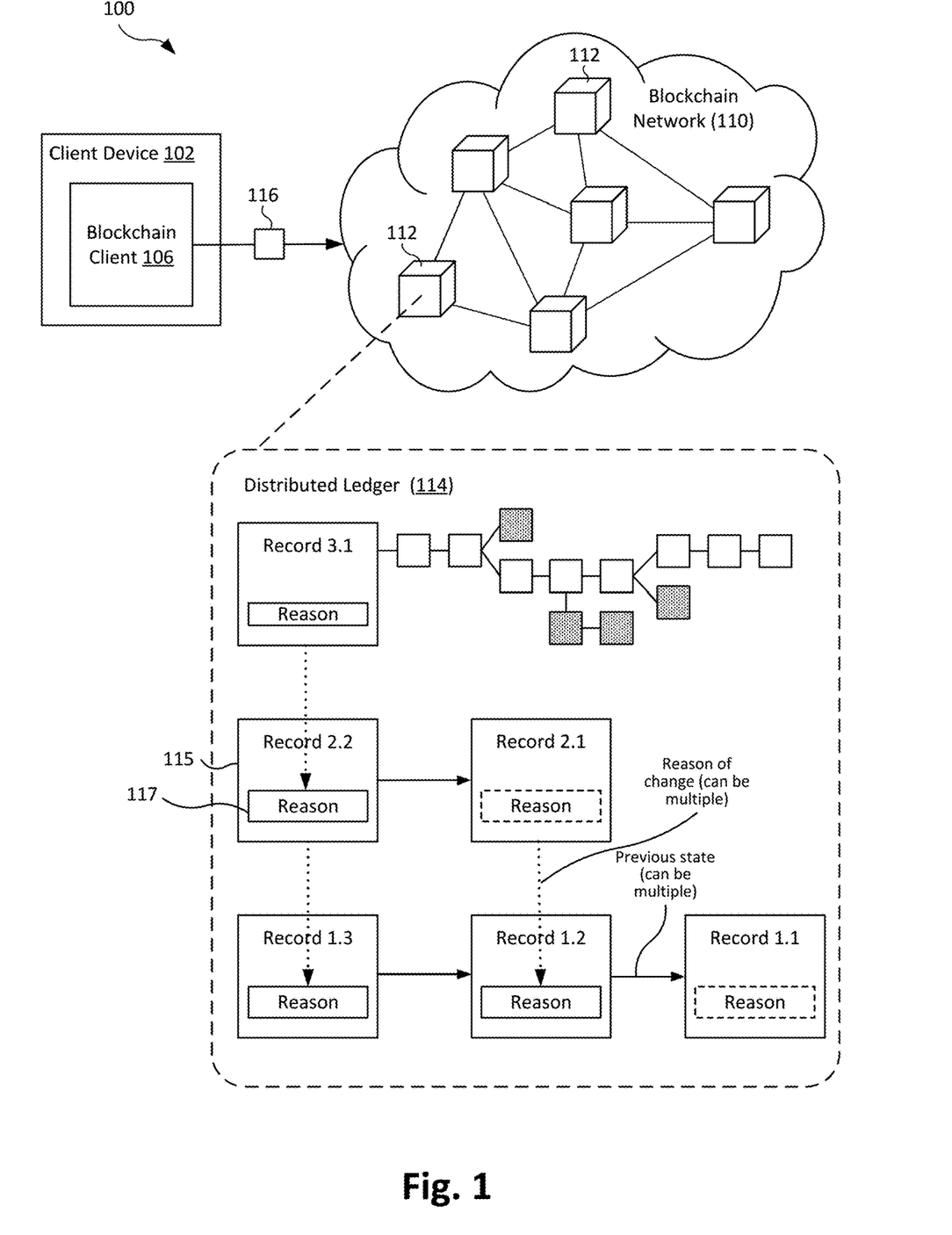
FIG. 1 is a block diagram of a system for managing and storing a distributed ledger of records.

FIG. 1 is a block diagram of a system 100 for managing and storing a distributed ledger of records, according to an exemplary aspect. The system 100 may include one or more client device(s) 102 communicatively connected to a blockchain network 110. The client device 102 may be one of personal computers, servers, laptops, tables, mobile devices, smart phones, cellular devices, portable gaming devices, media players or any other suitable devices that can retain, manipulate and transfer data. The client device 102 may include a blockchain client 106, which is a software application configured to generate and transmit one or more blockchain-based transactions or messages 116 to the blockchain network 110 for accessing or modifying records stored in the distributed ledger, such as managing user accounts, the transfer of cryptographic assets to and from such user accounts, and other types of operations.

According to an exemplary aspect, the blockchain network 110 can be a distributed peer-to-peer network formed from a plurality of nodes 112 (computing devices) that collectively maintain a distributed ledger 114. For purposes of the present discussion, the terms distributed ledger and blockchain may be interchangeably used. The blockchain 114 is a continuously-growing list of data records hardened against tampering and revision using cryptography and is composed of data structure blocks that hold the data received from other nodes 112 or other client nodes, including the client device 102 executing an instance of the blockchain client 106. The blockchain client 106 is configured to transmit data values to the blockchain network 110 as a transaction data structure 116, and the nodes 112 in the blockchain network record and validate/confirm when and in what sequence the data transactions enter and are logged in the existing blockchain 114.

In some aspects, the distributed ledger may be organized into multiple blockchains 114 which are configured to ensure chronological and immutable storage of data. In one aspect, the distributed ledger may include one or more lifeline blockchains, sideline blockchains, and jet blockchains. In one implementation, lifeline blockchains are individual blockchains in which each data object and all its states are stored (i.e., objects are treated as individual blockchains). Lifeline blockchains can have logic and code associated with them, so the terms lifeline blockchain, object, and smart contract may be used interchangeably. In one aspect, sideline blockchains are utility lifeline blockchains used to store temporary or auxiliary data such as indexes, pending operations, or debug logs. A lifeline blockchain can have several associated sideline blockchains to store information. A jet blockchain may be configured to act as a shard or partition which make up storage blocks and form shard chains. Records in a jet blockchain may be first produced by a lifeline blockchain, then packaged into blocks, and placed in sequence to form a chain of blocks. Replication and distribution of data can be managed individually by blocks and jet blockchains. The use of multiple kinds of blockchains enables dynamic reconfiguration of storage by splitting and merging of jet blocks without comprising data immutability.

Distributed ledgers, e.g., having a blockchain 114, are used to store a plurality of records 115, which may contain information such as a request, a response, a control of state, and maintenance details. In known approaches to blockchain technology, records 115 of a distributed ledger are ordered chronologically by time of creation or registration, and each record of a ledger may represent an operation (or a change) made and can have a reference to a previous record which represents a baseline for the operation. The reference uniquely identifies an entity (e.g., record) and is based on or includes information (e.g., checksum, hash, or signature) to validate the integrity of the entity the reference points to. Although data stored in blockchains might track changes of the state of the object in a ledger and the entity making the change, such storage techniques fail to log the reason for the change. Often, the reason for the change is entirely absent from the blockchain or might be shallowly recorded. This results in a non-uniform approach, e.g., it may require the user to include excessive detail on certain records, or to track dependencies using third-party systems that are external to a distributed ledger or blockchain system. The drawback to the known approach to blockchain technology arises in scenarios in which an investigation, claims, or reporting takes place with respect to the validity of ledger changes. Such investigations can become more costly as time goes by due to the amount of blockchain operations that must be investigated and the reasons as to why such operations were conducted (on the records of the ledger). Moreover, many organizations might not have the resource capacity to carry out such a resource-intensive investigation.

In some aspects, each record 115 may contain data objects. The term 'object' refers to an instance of a smart contract of a particular class/type ('type' and 'class' are used interchangeably). On the storage level, an object is represented by its lifeline (i.e., a set of different filaments that are linked to each other via their addresses and via the type systems (record and filament types)). A filament is a linked list of records. All filaments consist of records of different types. The terms 'smart contract', 'object', and 'lifeline' may be used interchangeably when one considers a particular instance of a class/type.

On the other hand, each object is associated with the code of the smart contract that was instantiated upon creating this instance. This code gets invoked by the network whenever this instance is processed (resulting in states that are stored in records and linked into the filament and further into the lifeline). The code is stored separately as a lifeline of a special type.

A record is a data structure that consists of several components that are stored separately. These are CatalogEntry, Record Body, Record Payload, Record Extension(s). CatalogEntry stores the required hashes and references and has the same structure for all record types. The platform uses CatalogEntry to manage records without having to dive deep into their internal structure. The links that are stored inside the CatalogEntry include both links to other records and links to binary objects inside Record Body, Record Payload, Record Extension(s), which are interpreted in accordance with the record type. When deleting data, you can delete data from Record Payload (for example), but CatalogEntry will remain unchanged.

A smart contract is a code comprised of computer-executable instructions that is run by one of the nodes 112 of the blockchain network when triggered by certain messages or transactions from other nodes or clients (e.g., blockchain clients 106). The smart-contract contains functionality that may be accessed to modify a state of the object. As used herein, the term functionality may be computer-executable code configured to perform one or more specific tasks or operations, and which may be organized within a single computing subroutine (e.g., function, method, procedure), distributed across multiple subroutines, distributed across multiple objects, or some combination thereof. When deployed to the blockchain 114, a smart contract may be allocated a unique contract address associated with the smart contract. For example, the contract address of the smart contract may be formatted similarly to a hash of a public encryption key, but does not have any mathematical relation to a corresponding private key (as a public key has). The contract address associated with the smart contract can be used to trigger the functionality provided by the smart contract. For example, the blockchain client 106 may send a blockchain transaction to the blockchain network having a recipient address field specifying the smart contract and a payload specifying that the particular functionality is to be triggered. In another example, there may be other smart contract that are each deployed to the blockchain 114, and that interact with each other by calling or sending digital messages via the blockchain 114. That is, the smart-contract's functionality may be triggered by an invocation request from another smart-contract for example, using smart-contract messaging.

Aspects of the present disclosure provide an extended form of a distributed ledger referred to herein as an "assured" ledger that tracks causality as the chain of reasons why the ledger was updated and a change was made to a certain object that is represented on the ledger.

Accordingly, the assured ledger system strengthens blockchain technology and its application in business processes by allowing a full history and causation of actions to be maintained, together with the reasons why data within the ledger has been updated. This is particularly useful, for example, in contracting, since the origins of all operations can be traced for legal purposes, and the integrity of the reasons is guaranteed (assured).

According to an aspect, the blockchain 114 is configured such that a record 115 comprised in the blockchain contains a reference to a previous record and a reference 117 to a record (i.e., a "reason record") that represents another operation that caused creation of the record from the previous record. For instance, in the example portion of the blockchain 114 shown in FIG. 1, the record 1.2 contains a first reference to a previous record 1.1 (record 1.1 representing the previous state of record 1.2) and a second reference to a reason record 2.1 that represents an operation that caused creation of record 1.2 from record 1.1. In some aspects, the reference to a previous record can be omitted when the record introduces a new entity or element into a ledger. It is understood that the record 2.1 and records 1.1 and 1.2 may live in completely separate blockchains and/or different types of blockchains. That is, a reason record (record 2.1) may be stored in a separate blockchain and/or type of blockchain as the records representing current and previous states of an object (records 1.1 and 1.2). In some aspects, a data object and all its states are stored in a blockchain of records (e.g., records 1.1, 1.2, and 1.3).

In one aspect, each record 115 may include information about which nodes/servers have performed the operation described by the record, and may include a proof (or a reference to a record with such proof) that node(s) had rights or were entitled to perform the operation with to create or register the record. In some aspects, such information may include binding digital signatures of which node did what action and indications of why the action was permitted.

As will be described below, the logical organization of the assured distributed ledger 114 in the present disclosure is based on records, which are base elements that represent a minimal storage unit; filaments, which are a sequence of records associated with the same entity or function; lifelines, which are a combination of primary filaments for object state and other auxiliary filaments attached; and Jets, which are groups of lifelines and their records, which will be stored together.

Figure 2:
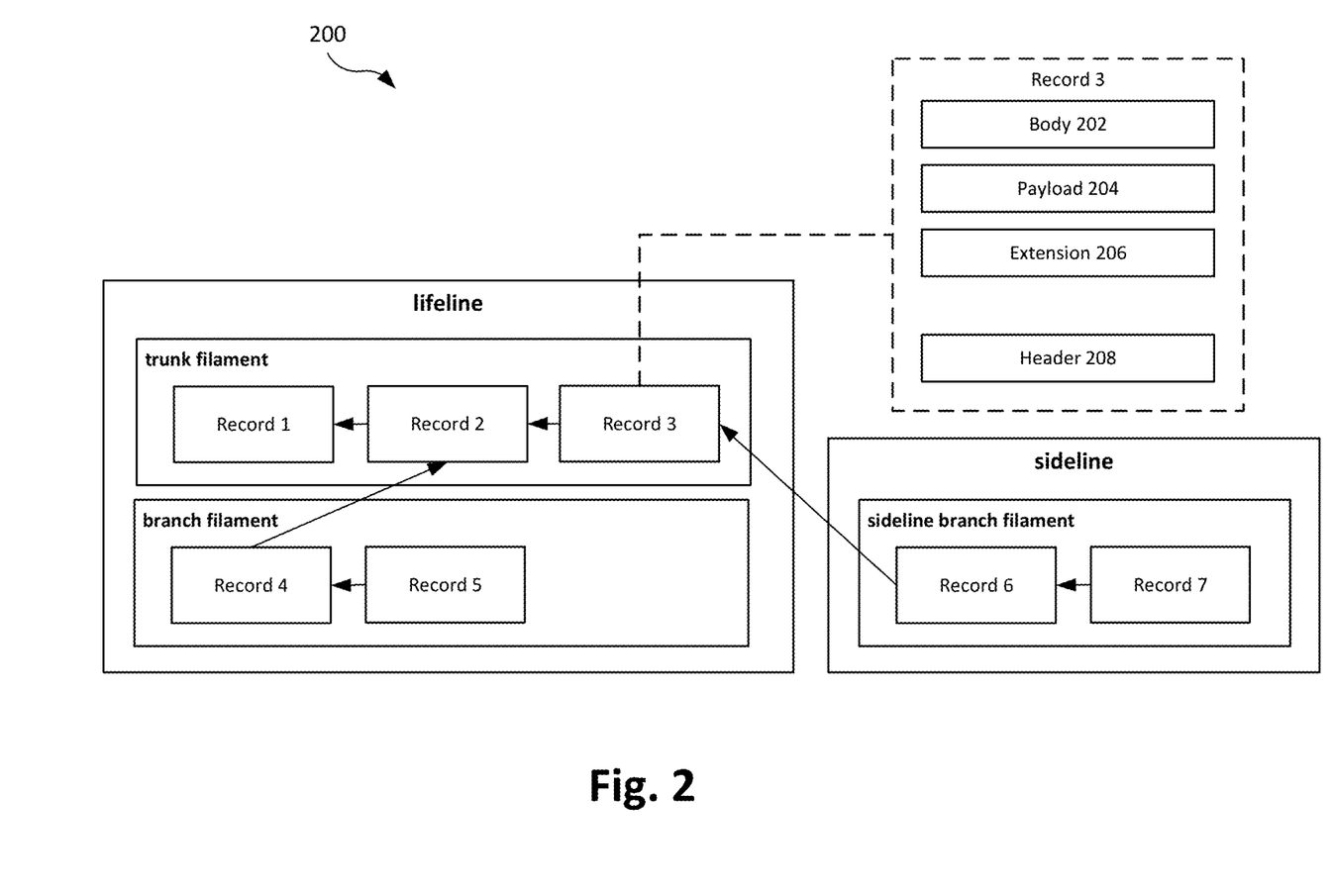
FIG. 2 is a block diagram illustrating a lifeline and a sideline.

FIG. 2 is block diagram 200 illustrating a lifeline and a sideline. As shown in FIG. 2, a lifeline may comprise a trunk filament and a branch filament. A sideline may comprise a sideline branch filament. Each filament comprises a set of linked records.

In the present disclosure, a request may be a call from a smart contract or come from an event external to system 100 (e.g., an API-request from a user). The content of the request determines how the state of an object should be changed and the initiator of the changes. In response to requests, output in the form of results is produced by smart contracts during execution, and returned to the calling party; and the state of the called object is changed and saved in a new record of this object's lifeline.

A record (e.g., record 3) comprises a plurality of parts. In particular, a record may comprise record body 202, record payload 204, record extension 206, and record header (CatalogEntry) 208. Record body 202 is for storing the data required by the network to correctly route a request, as a service call, between network components such as the requestor and the initiator of changes. For some record types, record payload 204 may comprise parameters of the request that should be passed to the smart contract for processing. For other record types, e.g. for records related to changing the state of an object, the state of the object is also stored in payload 204. Record extension 206 is storage for side effects (i.e., additional parameters or outputs for network mechanisms or for smart contracts) produced during routing of the call and processing the request.

Record body 202, record payload 204, and record extension 206 comprise serialized data (e.g. in binary format). They are stored separately from the header 208 of the record which is called CatalogEntry. The CatalogEntry comprises links (references or addresses) to record body 202, record payload 204, and record extension 206, and it may also contain digital signatures of the producer of a record (i.e., the virtual node that performed the processing of body 202, payload 204, and extension 206) and the registrar of a record (i.e. the node that performed composition of the record). Due to this record composition, a storage subsystem of ledger 114 may operate on records without de-serializing the data. The division of records into these parts makes records quicker to manipulate, allows for optimized storage of the payload data of particular records and collections of records, and allows for manipulation of the payload data without breaking the header. The lightweight, fixed-size composition of CatalogEntries allows efficient storage operations in terms of organizing, searching, and retrieving storage blocks and individual records without reading the full stored data, and without manipulating blockchains of individual objects.

The next level of storage organization is a filament, which is a sequence of records connected in a unidirectional linked list, which is in a most-to-less recent order. A filament is identified by reference to its head (the first record), and every record of a filament has an affinity field, which refers to the filament's head. More specifically, object states may be stored in filaments. The data of one object can be stored in one or several filaments. The trunk filament, which may also be referred to as a main thread filament, stores records of state changes of an object. A branch filament, which may also be referred to as an auxiliary filament, may be used for different purposes. For example, there may be a branch filament to store requests that caused state changes of objects. There may be another branch filament, which can store technical information about the object (e.g., the query execution time, or computation capacity that was used, or various execution logs).

Records inside filaments may refer to records of other filaments. Each record has a unique reference, or address, that uniquely identifies the record in the scope of the concrete platform instance. Moreover, a filament may be addressed as a whole, in particular by the address of the very first record in the filament. To speed up operations, each entry within a filament comprises a field that stores the address of the beginning of its filament. Thus, the record indicates which filament it belongs to.

Together, a trunk and one or more branch filaments linked to the trunk constitute the lifeline of an object. Lifelines require a head-to-tail index to find the tail (i.e., the most recent record). The head of a lifeline is its permanent identifier, while the tail is its most recent state.

Independent objects (e.g., lifelines) and their parts (e.g., trunk and branch filaments, sidelines) are stored independently from each other, thus providing options for scalable storage management. Storage of lifelines is organized so that related filaments and records are stored as close together as possible, and can be retrieved with minimal effort.

The network core differentiates between filaments that can only be accessed through the address of their lifeline (branch filaments) and those that can be accessed directly (sidelines). This is done to optimize the management of special types of information, since it can be moved to a sideline and stored/retrieved separately.

Records in filaments can be of different types, for example: start of filament, end of filament, start of lifeline, continuation of a sharded storage structure (discussed in FIG. 3), state of an object, request to the object, result of the request, dust records for debugging information, records for storing logs of used resources, etc.

Different filaments may comprise only records of a certain set of types, according to the specialization of a filament. For example, the trunk filament may mostly comprise states of objects, along with records for maintaining lifeline consistency across different Jet Drops (discussed in FIG. 3). For a particular object, a filament may be used to store requests that the object has sent to other objects and another filament may be used to store requests that the object has received from other objects, and the former filament may contain the results that were received in response to the requests. In some aspects, there may be a separate filament of "results", in which responses to requests are stored.

Every record of the object state may refer to a request record in a filament. This is realized by storing a reference (address) of the record that comprises the request for this state change in the special field of the state record. This provides a method for tracking the history of all object's states in their connection to the originating events. In some cases, to trace the state change to the originating request it may be necessary to traverse a set of linked records that contain statuses of several stages of the request processing, all those records may be stored in the branch filament dedicated to storage of requests.

Figure 3:
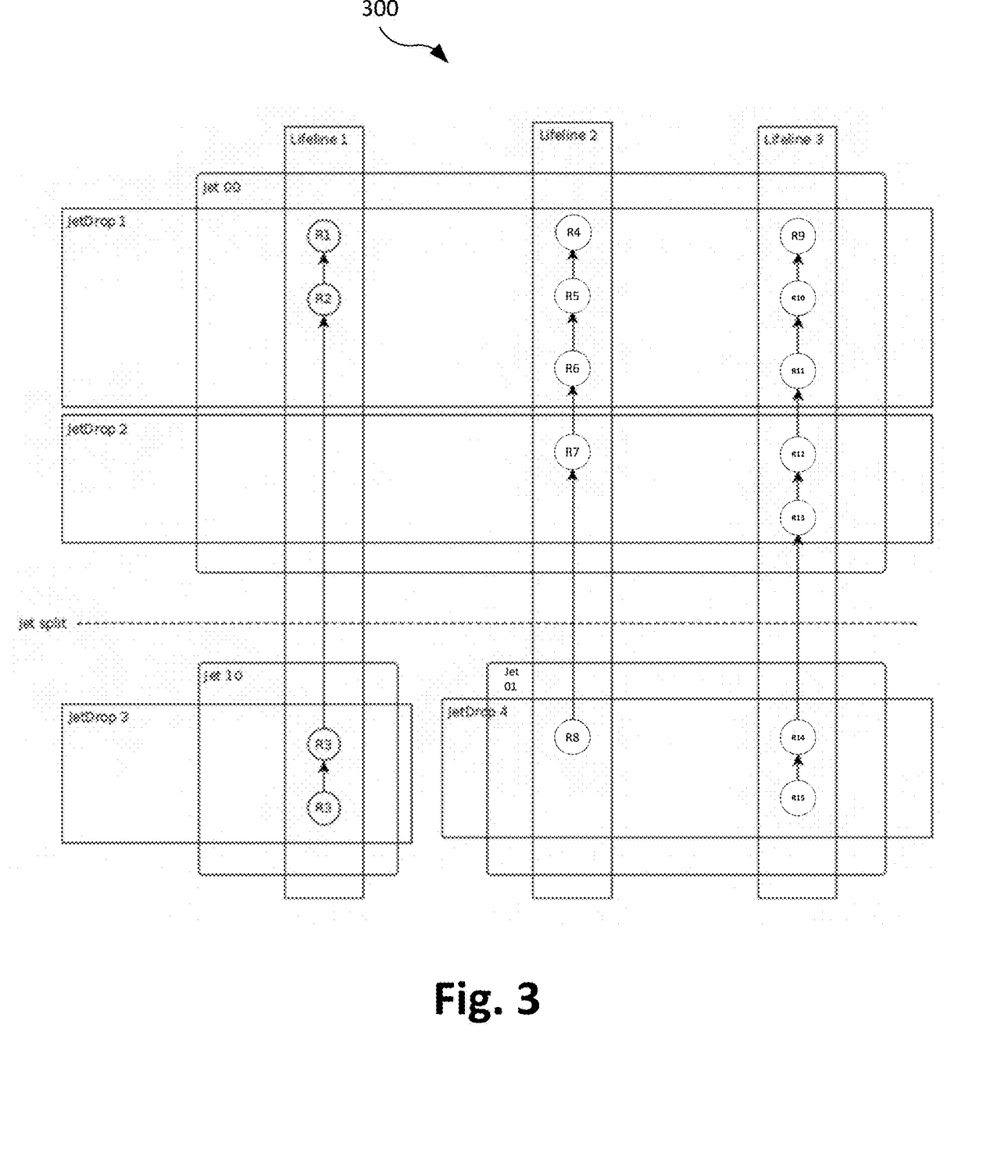
FIG. 3 is a block diagram illustrating a plurality of Jets and Jet Drops.

FIG. 3 is block diagram 300 illustrating a plurality of Jet Drops and Jets. Since the amount of data in a distributed network is constantly growing, an efficient distributed storage and sharding mechanism is necessary to flexibly scale and manipulate (e.g., retrieve and store) the data. In the proposed implementation, this mechanism is based on several principles.

First, data should be stored in such a way that the cost of recording and retrieving it would be minimized ('least possible cost'). This principle is realized by organizing the storage of records as a linked list, with each record containing links (one or more) to other records. This allows for the traversing of any particular chain in linear time while keeping the storing time constant.

Second, related data should be stored close ('affinity') to minimize retrieval time. This is achieved by storing data of a particular object in a logical structure called a Jet. The uppermost logical element of capacity scalability management is a Jet, which is a partition or shard to which nodes with storage and processing capacities are allocated. All records of a filament and all filaments attached to a lifeline are associated with the same Jet. Thus, each object is always associated to one particular Jet, while one Jet may contain many different objects. Since each object belongs to one particular Jet, the network can structure the processing and storage of a set of different objects into several Jets, according to the storage capacity and/or the processing power that is required to process and handle the data of those particular objects.

When controlling jets, the platform can take into account the statistics of inter-object calls to optimize the placement of objects so that objects that often call each other are allocated to the same one jet.

Third, while processing an object, the recently stored data will be read most frequently by the processing mechanism. Therefore, data is stored in such a way as to facilitate quick access to all objects that have been processed recently ('caching').

In the network of the present disclosure, the storage system and the processing system of a network 110, work in time cycles known as pulses. During each pulse, all records pertaining to all objects that have been processed during this pulse are structured into their respective Jets, and units of physical storage, or Jet Drops, are formed.

In the proposed terminology, each pulse-related storage block is called a Jet Drop, and chronological sequences of Jet Drops constitute one or several Jets. Jet Drops contain all records registered within a pulse for all lifelines and filaments of a Jet. Jet Drops are units of storage that are linked together through a mechanism that is similar to linking records in the object blockchain. Namely, each Jet Drop contains a hash of the previous Jet Drop, both Jet Drops representing successive states in a lifecycle of a particular Jet which progresses over consecutive pulses. Thus, Jet Drops are write-once elements of the linked list.

In FIG. 3, plurality of records are shown. Records R1-R3 are comprised in lifeline 1, records R4-R8 are comprised in lifeline 2, and records R9-R15 are comprised in lifeline 3. Each record is connected in the particular order shown. For simplicity, suppose that each lifeline comprises only one filament each. Records R1, R2, R4, R5, R6, R7 R9, R10, R11, R12, and R13 may be associated with Jet 00. Records R3 may be associated with Jet 10, and records R8, R14, and R15 may be associated with Jet 01. As noted before, each Jet Drop comprises all records registered within a pulse for all lifelines and filaments of a Jet. As shown in FIG. 3, this indicates that records R7, R12, and R13 (which are contained in Jet Drop 2) were registered in a separate pulse than all other records of Jet 00 (which are contained in Jet Drop 1). Jet 10 comprises Jet Drop 3 and Jet 01 comprises Jet Drop 4.

Figure 4:
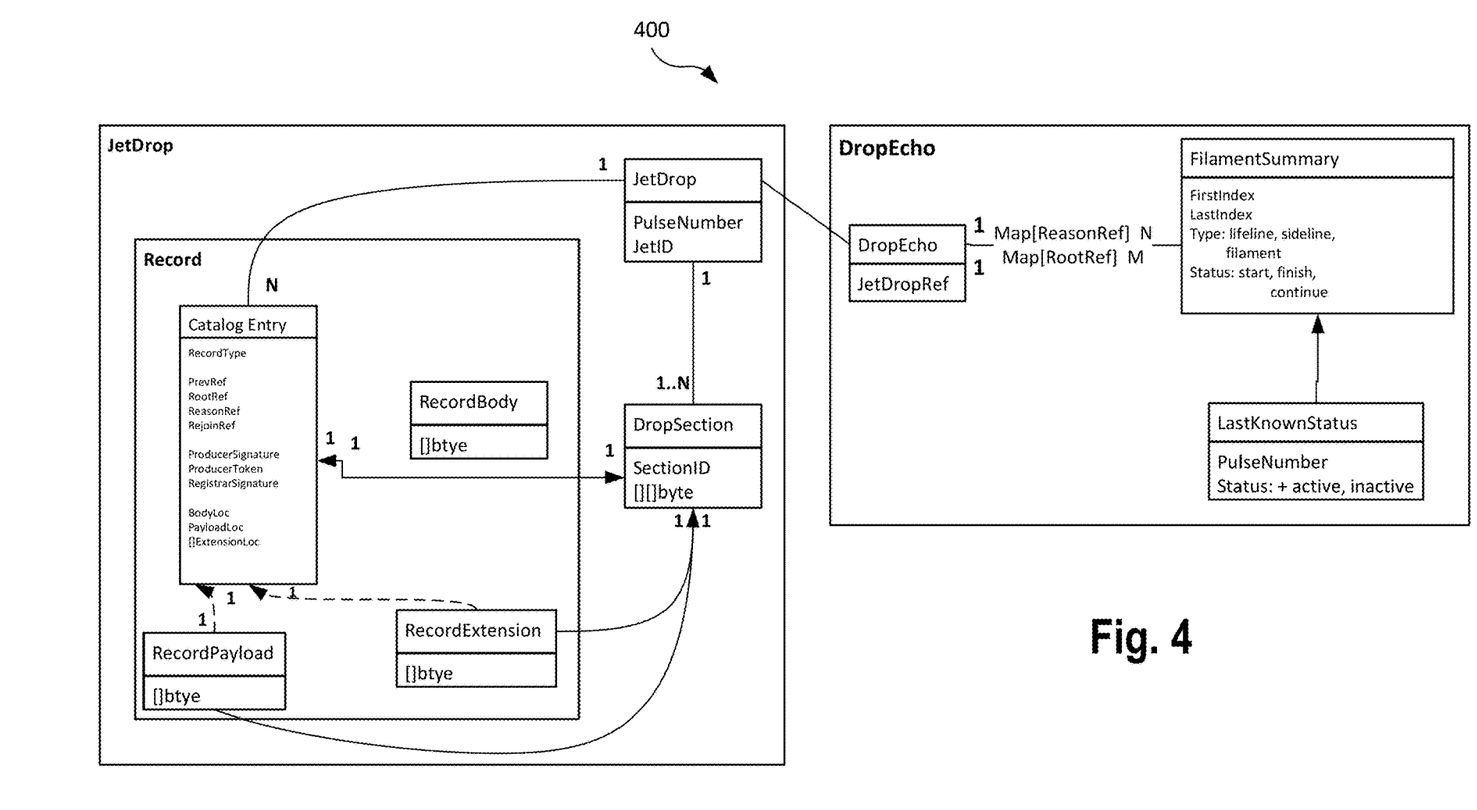
FIG. 4 is a block diagram illustrating a Jet Drop and a DropEcho.

FIG. 4 is block diagram 400 illustrating a Jet Drop and a DropEcho. After saving the Jet Drop, the append-only DropEcho structure is created. A DropEcho is built on the basis of records and filaments which were included into the corresponding Jet Drop. A DropEcho is used to speed up the search of data and to facilitate delayed operations on binary data in the Jet Drop (like wipeouts, which will be described below). In particular, a DropEcho may comprise indexing information about each filament included in the Jet Drop (e.g., start of filament, end of filament, continuity information to link filaments between different Jet Drops, types of filaments and objects, status of filaments and objects (e.g., active or inactive)).

In FIG. 4, the Jet Drop has a pulse number indicative of the cycle the record was registered and a Jet ID indicative of the Jet that the Jet Drop is associated with. The Jet Drop comprises a record that has four parts: CatalogEntry, the record body, payload, and extension. CatalogEntry that has links to the record payload, body, and extension, as well as an indication of the type of record, and references to the previous record, the root, the reason, and a rejoin reference. The DropEcho has a reference to the Jet Drop, a Filament Summary with Index Information, and own records, which can have record type, record status, and last known status.

Every Jet Drop may contain several sections (e.g., for main (i.e. state) information on objects, for additional and for auxiliary information). There may be more than one section of each type. A Jet is composed of objects, i.e., from lifelines/filaments of all sorts that compose those objects. The network core balances the load on the storage. As indicated above, if an object becomes too heavy in size, network 110 may split the Jet that it is contained in. When an object becomes too light in size, network 110 may merge two Jets into one. More specifically, when the amount of data for a specific object decreases, network 110 may merge the previously separated Jets together. The network may take into account additional information when performing splits and mergers of the Jets, e.g., statistics of interactions between objects, so that their records can be stored closer together (in a single common Jet) or farther apart (in different Jets). On the level of storage units (i.e., Jet Drops), there may be more or fewer Jet Drops. Therefore, in addition to data records, each Jet Drop contains auxiliary information about splits and mergers.

As an example of what can be achieved with this storage structure, consider the wipeout of data—when a particular data expires and can be erased according to business process rules, or when a particular agent (i.e., a client) requires that some data be erased from the system (e.g., GDPR compliance requirements). Existing DLT networks do not allow for wipeout because the integrity of the blockchain would break. Hence, in such networks data that may be subject to subsequent deletion must be kept entirely off the blockchain, which compromises efficiency of the business process.

Since the CatalogEntry stores only hashes and does not store actual data, it is technically possible to erase data while not breaking the storage integrity. However, if part of the data is deleted, the hashes that are calculated from this data will no longer match the recorded ones. Since those recorded hashes are part of the data source for the following blocks, a deletion like this is impossible for a traditional blockchain architecture. Therefore, an approach has been implemented to maintain integrity in the structure with the ability to delete data.

If there's a need to wipe the data of a particular record, the following may take place. The state of the object in the record in the original Jet Drop is erased by an executing node in network 110 (e.g., the binary payload of a particular record). The DropEcho is then updated to include a record of special type ('wipeout') to justify the fact of erasure. This record will comprise the request or a link to the request upon which the wipeout was performed as the reason. The wipeout operation will be validated according to the network logic (i.e., whether the executing nodes were indeed elected as executors, and their signatures are correct). Later on, when the full validation of the affected object might be performed, the network will automatically collect both the remaining data from the original Jet Drop comprising the affected record, and data from the DropEcho comprising the wipeout record. The reason for the wipeout will be validated along with the data, and the full output will be given to the validating party, i.e., the fact that the original record was amended plus the reason for the amendment.

As an example, an erasure request may come from a user (external to the network) making an API call from their management console (e.g., from a GDPR-compliant PII management console) to the platform to erase data. The API call is handled by the platform, and a series of requests are exchanged between different objects within the platform as a result (involving the creation of new object states, amending of blockchains, etc.). The erasure request resulting from the API call is passed to the object representing the calling user. The method for performing erasure on this object is invoked. The smart contract representing the user makes a special erasure request to a special smart contract (provided for control when the rules of the network have been set up) to find and erase a particular record in the lifeline (object) at a specific time. The record can be erased in its entirety or partly—which would imply creation of some new record with a partial copy of information. This request is promptly handled by the platform: i.e. it is executed by some node and then validated on the next pulse validated by other nodes.

This provides various advantages over conventional networks. Firstly, there is transaction assurance with native (platform level) recording of both object states and requests that resulted in those states, resulting in the ability to collect and check/validate the full object history along with the originating events. The transaction assurance further has a native (platform level) ability to trace any object state or any request to the external (e.g., API) call that led to that state or request being recorded in the ledger, by constructing the full chain of requests on the basis of links stored in the state records. This leads to enhanced verification and validation for changes in object states, allowing for complex business logic of change tracking.

Furthermore, there is optimized sharded storage of data where segmented storage of object data in different blockchains is linked together, allowing for flexible storage of different object parts (e.g., frequently accessed vs rarely accessed). Storage of objects in dedicated shards (jets) which may be stored independently, allowing for greater storage scaling and wipeout may be achieved by removal of data without corrupting the system integrity.

Figure 5:
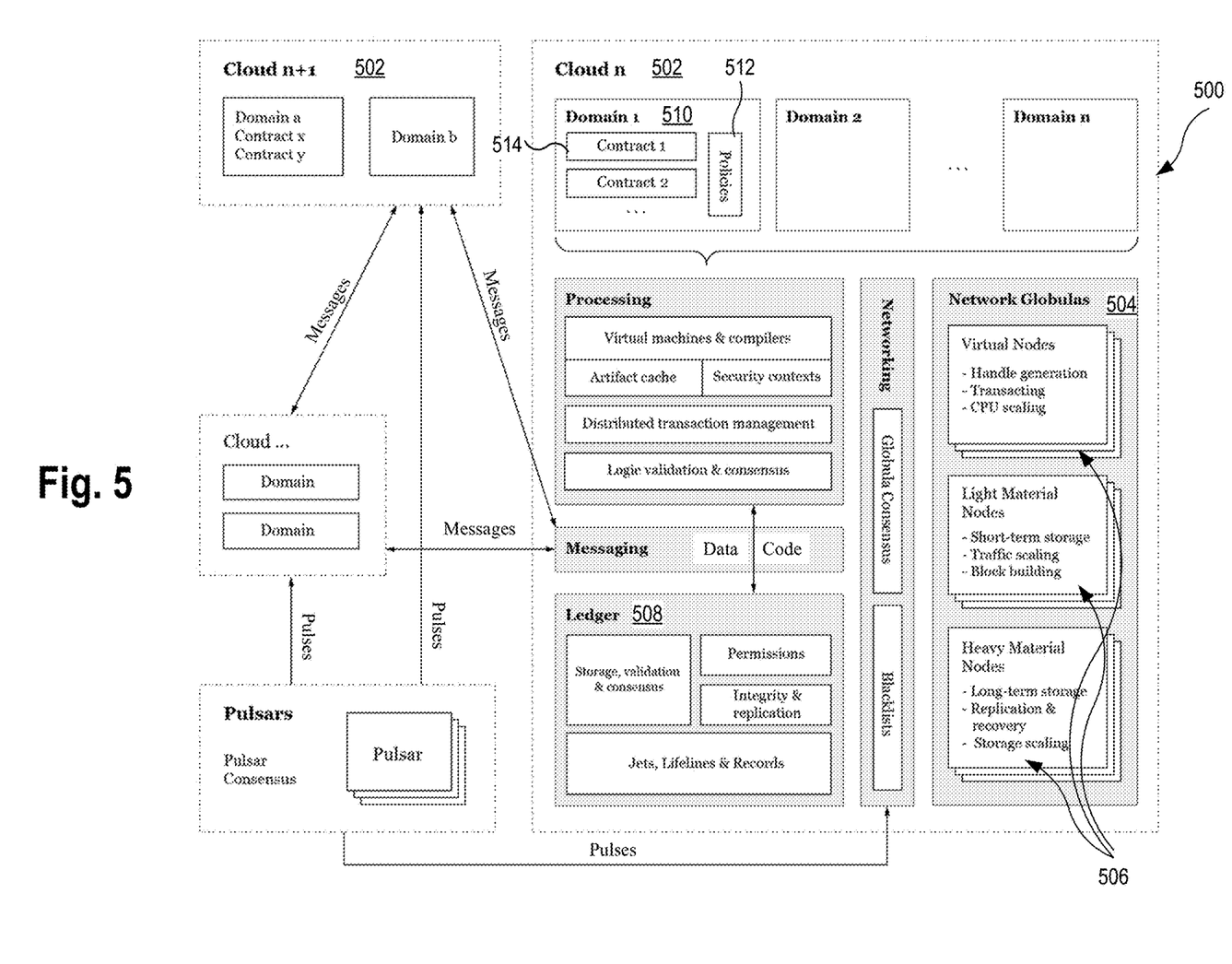
FIG. 5 is a block diagram illustrating an example architecture for a blockchain network.

FIG. 5 is a block diagram illustrating an example architecture for a blockchain network of nodes. An example system 500 according to the depicted architecture shown in FIG. 5 can be configured to provide the blockchain network (110) of nodes suitable for managing the distributed ledger 114 and implementing assured ledger technology and associated techniques described herein.

The system 500 comprises a plurality of component and subcomponents that supports execution of a federation of Clouds 502 (e.g., Cloud n, Cloud n+1), where each Cloud 502 is run and governed independently (e.g., by a community, company, industry consortia, or national agency). In one aspect, each Cloud 502 may be comprised of a blockchain network under a same node membership policy. Each Cloud 502 organizes and unifies software capabilities, hardware capacities, and financial and legal liability of nodes to ensure transparent and seamless operation of business services. Each Cloud 502 may include a Globula network 504 having a plurality of nodes 506 (i.e., computing instances or servers that provide hardware capacity to a Cloud). The Globula network 504 may act as a backbone of a Cloud, using a set of protocols enabling the coordination of networks of multitudes of nodes (e.g., 1,000's of nodes), including P2P networks and hierarchical nodes. In one aspect, the Globula network 504 may be configured to run as a decentralized network with consistency between the nodes managed by a leaderless, byzantine fault tolerant (BFT)-based consensus mechanism. In some aspects, the system 500 may include larger node networks of multiple Globula networks (e.g., 100 Globulas each having 1,000 nodes for a total of 100,000 nodes) that behave transparently across such networks in accordance with whichever contract logic is in place, and that rely on an inter-Globula network protocol with leader-based consensus.

In one aspect, each of the plurality of nodes 506 may be configured using a multi-role model: each node has a single static role (e.g., virtual, light material, heavy material, neutral) that defines its primary purpose and a set of dynamically assigned roles within the system 500. For example, a node having a virtual role performs calculations; a node having a light material role performs short-term data storage and network trafficking; a node having a heavy material role performs long-term data storage; and a node having a neutral role participates in the network consensus (not in the workload distribution) and has at least one utility role.

In one aspect, a Cloud 502 may include one or more domains 510 which is a decentralized application that governs access to consensus, mutability, and other capabilities for other decentralized applications. The use of multiple domains (e.g., Domain 1, Domain 2, . . . Domain n) enables different governance models, and can be used to define policies 512 for data and (smart) contracts 514, such as policies that allow public or permissioned models, or to apply national or industry standards. In one aspect, domains 510 establish governance of contracts and nodes, thus acting as a super contract that can contain objects and their history and can apply varying policies to the objects contained therein.

In one aspect, the Cloud 502 may be configured to store a distributed ledger 508 of data and records that are distributed across a network of nodes 506 that store data. In one aspect, data is stored in the ledger 508 as a series of immutable records. Records may be created and signed by virtual nodes. Each record may be addressed by its hash and a pulse number. Records can contain a reference to another record, thus, creating a chain. A record can contain a reference to another record (e.g., a reason record) in the same blockchain or in a different blockchain. An example of a chain is the object's lifeline. Each material node may be responsible for its own lifelines determined by their hashes.

Figure 6:
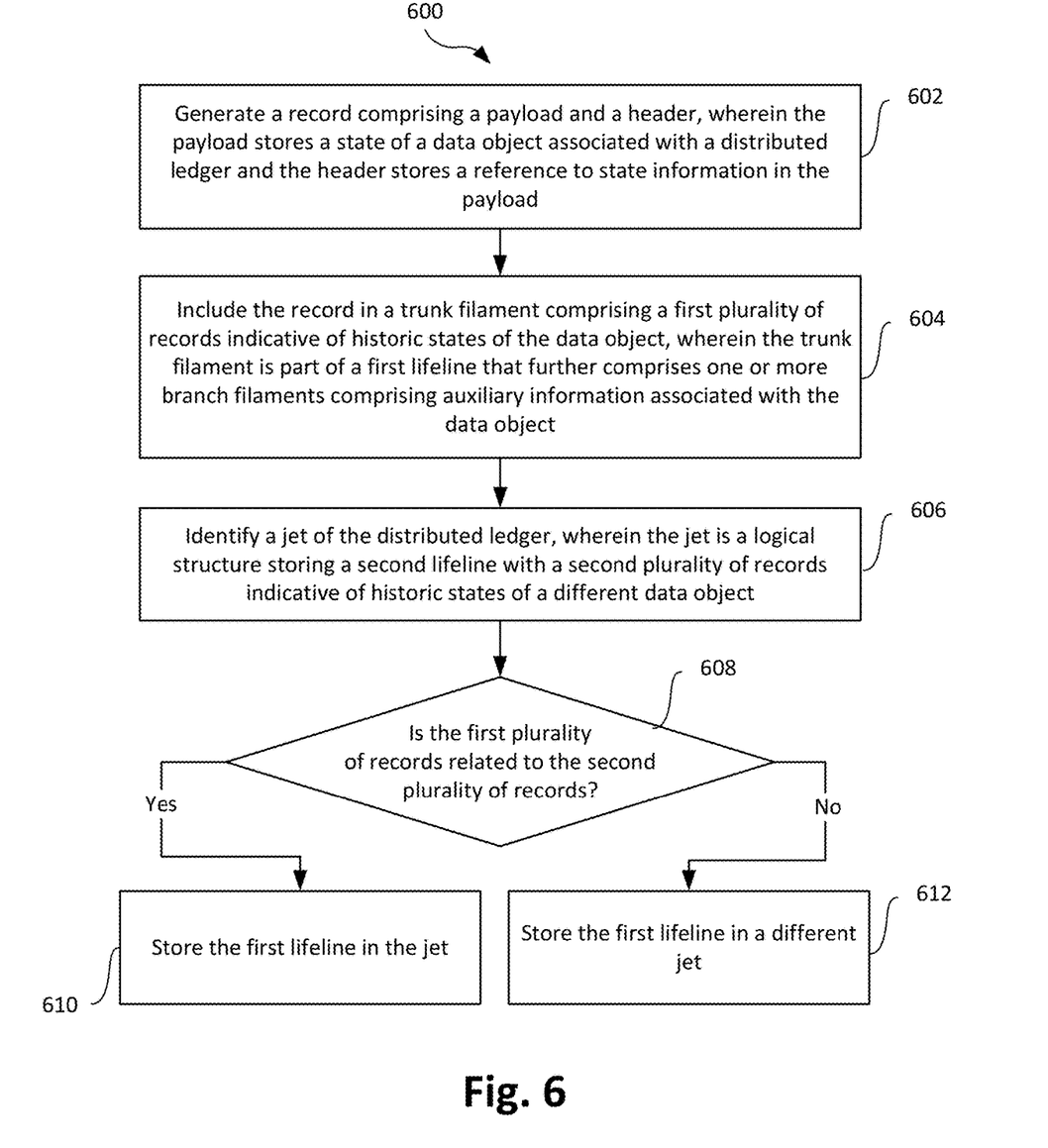
FIG. 6 is a flow diagram illustrating a method for efficiently storing a distributed ledger of records.

FIG. 6 is a flow diagram illustrating method 600 for efficiently storing a distributed ledger of records. At 602, a hardware processor of a node 112 in network 110 generates a record (e.g., record 3 in FIG. 2) comprising a payload (e.g., payload 204) and a header (e.g., header 208), wherein the payload stores a state of a data object associated with a distributed ledger (e.g., blockchain 114) and the header stores a reference to state information in the payload.

At 604, the hardware processor includes the record in a trunk filament (e.g., see FIG. 2) comprising a first plurality of records (e.g., records 1, 2, 3) indicative of historic states of the data object, wherein the trunk filament is part of a first lifeline that further comprises one or more branch filaments comprising auxiliary information associated with the data object. The auxiliary information in the one or more branch filaments comprises records indicative of at least one of: received/transmitted requests (e.g., to process a data object) and processing logs.

At 606, the hardware processor identifies a jet (e.g., jet 00) of the distributed ledger, wherein the jet is a logical structure storing a second lifeline (e.g., lifeline 2) with a second plurality of records indicative of historic states of a various data objects (e.g., R4, R5, etc.).

At 608, the hardware processor determines whether the first plurality of records is related to the second plurality of records. For example, the hardware processor may decide which lifeline (and subsequently which Jet Drop) a particular record belongs to. In the case of a set of records, the hardware processor performs analysis on whether the first set of records and the second set of records belong to the same object. If so, the lifelines should be stored in the same jet.

At 610, in response to determining the respective pluralities are related, the hardware processor stores the first lifeline in the jet. If it is determined that the respective pluralities are not related, method 600 proceeds to 612, where the hardware processor stores the first lifeline in a different jet (e.g., generates a new jet or identifies a more relatable jet). It should be noted that the distributed ledger may comprise a plurality of jets including the jet and different jet. While each jet may be associated with multiple objects, a particular object may not be associated with more than one jet.

Furthermore, because records in the distributed ledger are processed in cycles, all records registered within a first cycle for all lifelines in the jet are stored in a first jet drop, and all records registered within a second cycle for all lifelines in the jet are stored in a second jet drop.

Suppose that the generated record at 602 is stored in the first jet drop. The indexing information about the first jet drop may be stored in a DropEcho structure. This facilitates abilities such as performing data wipeout. For example, the hardware processor may wipe out data in the generated record at a subsequent time without corrupting data integrity of the distributed ledger. Here, wiping out the data in the generated record comprises erasing data in the payload and not erasing data in the header. The hardware processor stores a reason for erasing the data in the payload in the DropEcho structure, helps validate the reason by confirming that erasing the data in the payload took place in accordance with rules of a blockchain network maintaining the distributed ledger (which may be defined by some high level policies and/or business logic in the custom contracts).

Once the data is stored in the manner described in method 600, restoring the full object history is performed by collecting all states of a given data object by traversing the trunk filament. A hardware processor may determine reasons (i.e. requests that resulted in those state changes), by using references of that request stored in the header of the corresponding record or by additionally traversing records in a branch filament containing statuses of different stages of processing of the request. As this traversal occurs, the hardware processor collects statuses and reasons. In some aspects, the hardware processor includes the information from the auxiliary or branch filaments into constructing the state information, thus considering the state of the object along with any additional info stored in those filaments as a side effect produced by the request indicated by the reason.

In terms of restoring the full trace of requests that led to a specified state change, a hardware processor may identify a specified state of some specified data object (e.g., specified by a request). The hardware processor may then determine the reason, which would be a request that was sent by some caller object. The hardware processor may determine the caller object from the reason and consider the state of that caller object. The hardware processor may collect all the discovered states and requests, thus restoring the full trace. In some aspects, the hardware processor may not start from the data object's state, but from some specified request. In that case, the caller object is identified directly from the specified request.

Figure 7:
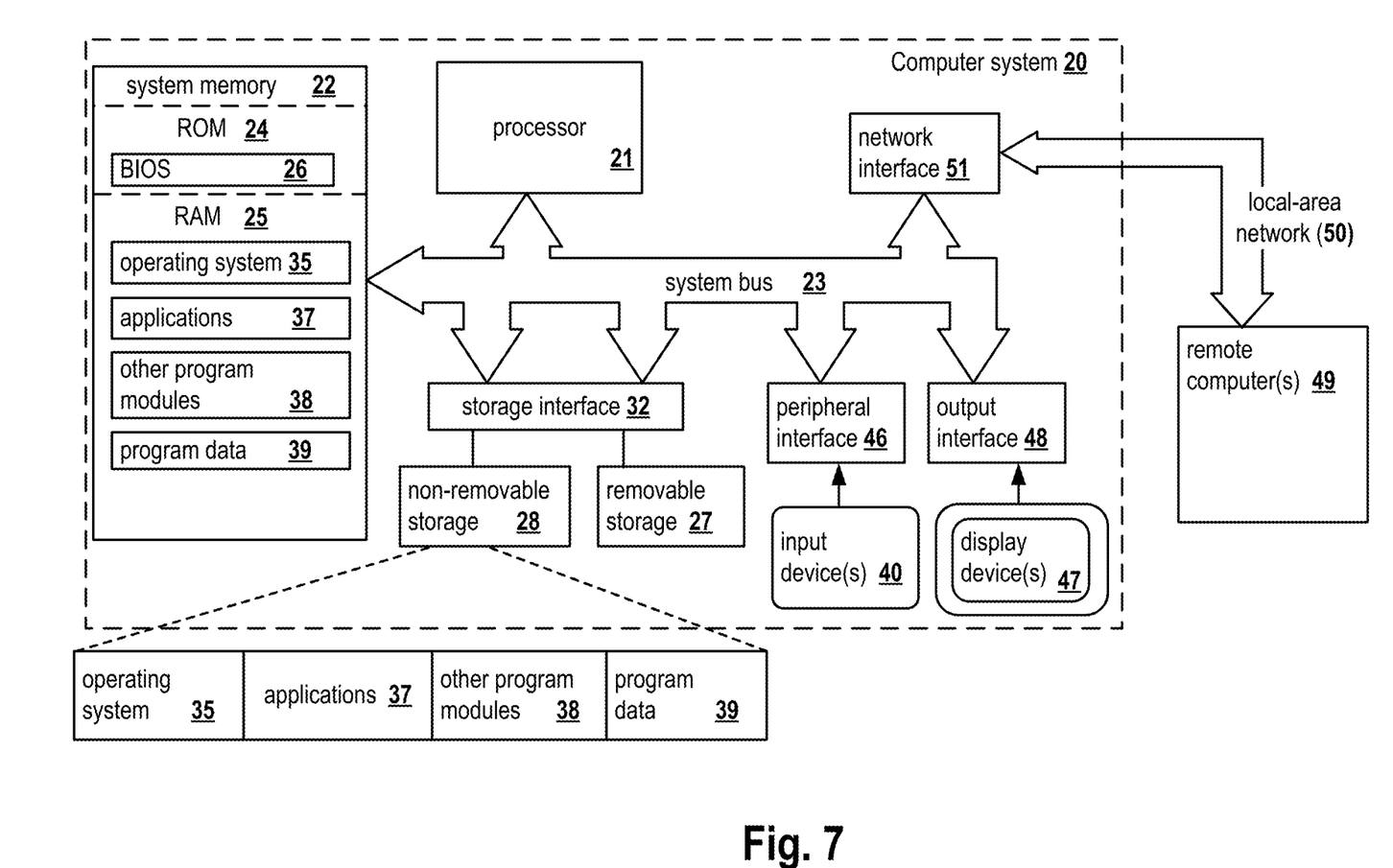
FIG. 7 is a block diagram of a computer system on which the disclosed system and method can be implemented according to an exemplary aspect.

FIG. 7 is a block diagram illustrating a computer system 20 on which aspects of systems and methods for efficiently storing records in a distributed ledger may be implemented in accordance with an exemplary aspect. It should be noted that the computer system 20 could correspond to the client device 102, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper Transport™, InfiniBand™, Serial ATA, 12C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for storing a distributed ledger of records, the method comprising:
generating a record comprising a payload and a header, wherein the payload stores a state of a data object associated with a distributed ledger and the header stores a reference to state information in the payload;
including the record in a trunk filament comprising a first plurality of records indicative of historic states of the data object, wherein the trunk filament is part of a first lifeline that further comprises one or more branch filaments comprising auxiliary information associated with the data object;
identifying a jet of the distributed ledger, wherein the jet is a logical structure storing several lifelines with a second plurality of records indicative of historic states of a plurality of data objects; and
in response to determining that the first plurality of records is related to the second plurality of records, storing the first lifeline in the jet.

2. The method of claim 1, wherein the plurality of data objects can be reordered between a plurality of jets in accordance with a statistic of inter-object calls for optimization purposes.

3. The method of claim 1, wherein the distributed ledger comprises a plurality of jets including the jet, and wherein the data object and the plurality of data objects are both associated with the jet and are not associated with any other jet in the plurality of jets.

4. The method of claim 1, wherein the auxiliary information in the one or more branch filaments comprises records indicative of at least one of: received requests, transmitted requests, and processing logs.

5. The method of claim 1, wherein records in the distributed ledger are processed in cycles, and wherein all records registered within a first cycle for all lifelines in the jet are stored in a first jet drop, and all records registered within a second cycle for all lifelines in the jet are stored in a second jet drop, wherein a jet drop is a physical storage unit.

6. The method of claim 5, wherein the generated record is stored in the first jet drop, and wherein indexing information about the first jet drop is stored in a DropEcho structure.

7. The method of claim 6, further comprising wiping out data in the generated record at a subsequent time without corrupting data integrity of the distributed ledger.

8. The method of claim 7, wherein wiping out the data in the generated record comprises:
erasing data in the payload and not erasing data in the header;
storing a reason for erasing the data in the payload in the DropEcho structure; and
validating the reason by confirming that erasing the data in the payload took place in accordance with rules of a blockchain network maintaining the distributed ledger.

9. A system for storing a distributed ledger of records, the system comprising: a memory; and a hardware processor communicatively coupled to the memory and configured to: generate a record comprising a payload and a header, wherein the payload stores a state of a data object associated with a distributed ledger and the header stores a reference to state information in the payload; include the record in a trunk filament comprising a first plurality of records indicative of historic states of the data object, wherein the trunk filament is part of a first lifeline that further comprises one or more branch filaments comprising auxiliary information associated with the data object; identify a jet of the distributed ledger, wherein the jet is a logical structure storing several lifelines with a second plurality of records indicative of historic states of a plurality of data objects; and in response to determining that the first plurality of records is related to the second plurality of records, store the first lifeline in the jet.

10. The system of claim 9, wherein the plurality of data objects can be reordered between a plurality of jets in accordance with a statistic of inter-object calls for optimization purposes.

11. The system of claim 9, wherein the distributed ledger comprises a plurality of jets including the jet, and wherein the data object and the plurality of data objects are both associated with the jet and are not associated with any other jet in the plurality of jets.

12. The system of claim 9, wherein the auxiliary information in the one or more branch filaments comprises records indicative of at least one of:
received requests, transmitted requests, and processing logs.

13. The system of claim 9, wherein records in the distributed ledger are processed in cycles, and wherein all records registered within a first cycle for all lifelines in the jet are stored in a first jet drop, and all records registered within a second cycle for all lifelines in the jet are stored in a second jet drop, wherein a jet drop is a physical storage unit.

14. The system of claim 13, wherein the generated record is stored in the first jet drop, and wherein indexing information about the first jet drop is stored in a DropEcho structure.

15. The system of claim 14, wherein the hardware processor is further configured to wipe out data in the generated record at a subsequent time without corrupting data integrity of the distributed ledger.

16. The system of claim 15, the hardware processor is configured to wipe out the data in the generated record by:
erasing data in the payload and not erasing data in the header;
storing a reason for erasing the data in the payload in the DropEcho structure; and
validating the reason by confirming that erasing the data in the payload took place in accordance with rules of a blockchain network maintaining the distributed ledger.

17. A non-transitory computer readable medium comprising computer-executable instructions for storing a distributed ledger of records, including instructions for:
generating a record comprising a payload and a header, wherein the payload stores a state of a data object associated with a distributed ledger and the header stores a reference to state information in the payload;
including the record in a trunk filament comprising a first plurality of records indicative of historic states of the data object, wherein the trunk filament is part of a first lifeline that further comprises one or more branch filaments comprising auxiliary information associated with the data object;

identifying a jet of the distributed ledger, wherein the jet is a logical structure storing several lifelines with a second plurality of records indicative of historic states of a plurality of data objects; and in response to determining that the first plurality of records is related to the second plurality of records, storing the first lifeline in the jet.

18. The non-transitory computer readable medium of claim 17, wherein the plurality of data objects can be reordered between a plurality of jets in accordance with a statistic of inter-object calls for optimization purposes.

19. The non-transitory computer readable medium of claim 17, wherein the distributed ledger comprises a plurality of jets including the jet, and wherein the data object and the plurality of data objects are both associated with the jet and are not associated with any other jet in the plurality of jets.

* * * * *